(12) United States Patent
Taki et al.

(10) Patent No.: US 8,173,192 B2
(45) Date of Patent: May 8, 2012

(54) W1/O/W2 TYPE COMPOSITE EMULSIFIED DRESSING AND METHOD FOR PREPARING THE SAME

(75) Inventors: Jiro Taki, Kawasaki (JP); Takashi Isomura, Kawasaki (JP); Kazumichi Kanda, Kawasaki (JP); Atsushi Kawahara, Kawasaki (JP); Kentaro Maruyama, Kawasaki (JP); Soichiro Kusumoto, Chuo-ku (JP)

(73) Assignees: Knorr Foods Co., Ltd., Kawasaki-shi (JP); Ajinomoto Co., Inc., Tokyo (JP)

( * ) Notice: Subject to any disclaimer, the term of this patent is extended or adjusted under 35 U.S.C. 154(b) by 695 days.

(21) Appl. No.: 12/102,443

(22) Filed: Apr. 14, 2008

(65) Prior Publication Data

US 2008/0206427 A1 Aug. 28, 2008

Related U.S. Application Data

(63) Continuation of application No. PCT/JP2006/320550, filed on Oct. 16, 2006.

(30) Foreign Application Priority Data

Oct. 14, 2005 (JP) ................. 2005-300442

(51) Int. Cl.
 *A23L 1/24* (2006.01)
(52) U.S. Cl. ....................... 426/602; 426/577
(58) Field of Classification Search ............. 426/602, 426/577
See application file for complete search history.

(56) References Cited

U.S. PATENT DOCUMENTS

| | | | | |
|---|---|---|---|---|
| 4,626,444 | A | * | 12/1986 | Takahashi et al. ............. 426/602 |
| 4,632,840 | A | * | 12/1986 | Takahashi et al. ............. 426/602 |
| 2004/0010078 | A1 | | 1/2004 | Nagahama et al. |
| 2004/0101613 | A1 | * | 5/2004 | Levi ............................... 426/601 |

FOREIGN PATENT DOCUMENTS

| | | |
|---|---|---|
| JP | 59-173131 | 10/1984 |
| JP | 60-184366 | 9/1985 |
| JP | 60-203139 | 10/1985 |
| JP | 09-107915 | 4/1997 |
| JP | 2001-327247 | 11/2001 |
| JP | 2005-185180 | 7/2005 |
| WO | 02/43698 | 6/2002 |
| WO | 2004/047562 | 6/2004 |

OTHER PUBLICATIONS

European Office Action issued on May 20, 2011 in corresponding European Patent Application No. 06 811 821.5, filed Oct. 16, 2006.
Database WPI, Week 199813, Thomson Scientific, London, GB; AN 1998-138165 and JP 10 014494 A (Nitta Gelatin KK) Jan. 20, 1998.

* cited by examiner

*Primary Examiner* — Carolyn Paden
(74) *Attorney, Agent, or Firm* — Oblon, Spivak, McClelland, Maier & Neustadt, L.L.P.

(57) ABSTRACT

The invention provides a W1/O/W2 type composite emulsified dressing characterized in that it comprises a polyglycerol polyricinoleate having a degree of esterification of 10-30% and a degree of ricinoleic acid-condensation of 5-8 and that it has a viscosity of 1,000-300,000 mPa·s, and a method for the preparation of the dressing which comprises the steps of 90-10 parts by mass of an aqueous phase (W1) is mixed with 10-90 parts by mass of an oily phase (O) to thus form a W1/O type emulsion and then 100 parts by mass of the resulting W1/O type emulsion is blended with 25-150 parts by mass of an aqueous phase (W2) to thus give a W1/O/W2 type composite emulsified dressing, wherein the dressing comprises a polyglycerol polyricinoleate having a degree of esterification of 10-30% and a degree of ricinoleic acid-condensation of 5-8, in an amount ranging from 0.01-5% by mass on the basis of the total mass of the W1/O/W2 type composite emulsified dressing. The dressing are quite excellent in their storage stability.

6 Claims, No Drawings

W1/O/W2 TYPE COMPOSITE EMULSIFIED DRESSING AND METHOD FOR PREPARING THE SAME

CROSS-REFERENCE TO RELATED APPLICATIONS

The present application is a continuation of PCT/JP2006/320550, filed on Oct. 16, 2006 which claims priority to JP 2005-300442, filed on Oct. 14, 2005.

TECHNICAL FIELD

The present invention relates to W1/O/W2 type composite emulsified dressing and a method for the preparation thereof.

BACKGROUND ART

There have conventionally been variously investigated a W/O/W type emulsion for use as a medicine in which a drug is encapsulated within an internal aqueous phase; a cosmetic preparation which can provide smooth feeling when it is applied onto the skin; and a food having a low calorie. However, the W/O/W type emulsion suffers from a problem in that it is insufficient in its stability as compared with O/W type one or the like. One of the reasons for this is that salts and saccharides present in an internal aqueous phase and an outer aqueous phase may serve to establish an osmotic pressure difference between them and this in turn results in the transfer or exchange of water between them through an oil phase. In particular, when the emulsion of this type is applied to a food product, a variety of components interact with one another in a complicated manner and accordingly, it has been believed that there have not yet been proposed any dressing in the form of a W/O/W type emulsion having excellent storage stability which allows the dressing to withstand currently used various conditions encountered when articles on the market are distributed and stored, to say nothing of such an emulsion stored or managed in a laboratory in which conditions such as temperature and raw materials would be strictly controlled.

There have been known methods for preparing a W/O/W type emulsion for use in a food such as dressing and mayonnaise, whose acidity or sourness is reduced (see Patent Document 1 given below). According to this invention, the emulsion is characterized in that the amount of water present in an internal aqueous phase thereof is greater than that present in an outer aqueous phase and that the amount of an acidulant contained in the internal aqueous phase is greater than that contained in the outer aqueous phase. For this reason, the emulsion is greatly limited in its applications when using the same as a food in view of taste and palatability as well as production cost thereof. Moreover, Patent Document 1 simply discloses currently known information about polyglycerol polyricinoleate.

There has also been known a method for the preparation of a W/O/W type composite emulsion which comprises, as an essential element, adding a polyglycerol polyricinoleate to an internal aqueous phase of the emulsion (see Patent Document 2 given below). This invention aims at the preparation of dressing and mayonnaise, which are excellent in their stability. However, any polyglycerol polyricinoleate can be used in this invention and there is not disclosed any limitation on the degree of esterification and the degree of condensation of ricinoleic acid and there is not likewise any limitation in the amount thereof to be incorporated. It was found to be difficult for the invention disclosed in this document, to prepare any W/O/W type composite emulsion excellent in its storage stability to such an extent that it can be distributed as an article on the market.

There has also been known an invention concerning dressing in the form of a W/O/W type composite emulsion (see Patent Document 3 given below). Patent Document 3 discloses a polyglycerol polyricinoleate as an example of an emulsifying agent used therein. However, this patent document simply discloses general knowledge about W/O/W type composite emulsion.

There has also been known a method for the preparation of a W/O/W type composite emulsion characterized in that a lipophilic polyglycerin fatty acid ester is incorporated into the emulsion (see Patent Document 4 given below). Patent Document 4 discloses a hexaglycerol polyricinoleate as an emulsifying agent usable in the invention. However, this patent document states that any emulsifying agent other than the polyglycerol polyricinoleate may be used in the W/O/W type composite emulsion and accordingly, it is not believed that the resulting product or emulsion will have satisfactory stability.

There has likewise been known a method for preparing a W/O/W type composite emulsion which is characterized in that water, an oily component and a lipophilic emulsifying agent are incorporated into the emulsion in a specific mixing ratio and which can maintain a high rate of a drug to be encapsulated into an inner aqueous phase of the composite emulsion (see Patent Document 5 given below). However, it is essential in this invention to use the lipophilic emulsifying agent in an amount of not less than 20% and not more than 66% and accordingly, it is recognized that it is quite difficult to use the emulsion as an ingredient for a food while taking into consideration production cost, taste and palatability thereof as well as method for the preparation of the same.

There has been known a mushroom extract-containing composite emulsion characterized in that it comprises 0.5 to 10% by mass of a polyglycerol polyricinoleate whose glycerin-condensation degree corresponds to dimer to hexamer, relative to oil and fat component (see Patent Document 6 given below). It is an object of this invention to mask bitterness or a bitter taste of the extract derived from mushroom and the invention is characterized in that an aqueous solution containing the mushroom extract is gradually added to and dispersed in an oil component to thus form a W1/O type emulsion, and the resulting emulsion is then dispersed in water (W2) to thus give a W1/O/W2 type emulsion. This patent document specifies the degree of ricinoleic acid-condensation in the polyglycerol polyricinoleate used therein and the degree of glycerin-condensation of the polyglycerin, but the document does not disclose or teach the degree of esterification thereof.

Patent Document 1: WO2004/047562
Patent Document 2: JP-A-60-203139
Patent Document 3: JP-A-60-184366
Patent Document 4: JP-A-59-173131
Patent Document 5: WO 2002/043698
Patent Document 6: JP-A-2005-185180

DISCLOSURE OF THE INVENTION

Problems that the Invention is to Solve

It is an object of the present invention to provide W1/O/W2 type composite emulsified dressing and a method for the preparation thereof.

Means for Solving the Problems

The inventors of this invention have conducted various studies to solve the problems associated with conventional techniques, have found that the use of a polyglycerol polyricinoleate having a specific degree of esterification and a specific degree of ricinoleic acid-condensation permits the preparation of W1/O/W2 type composite emulsified dressing excellent in storage stability and have thus completed the present invention.

More specifically, the following are the details of the present invention:

(1) W1/O/W2 Type composite emulsified dressing characterized in that it comprises a polyglycerol polyricinoleate having a degree of esterification of not less than 10% and not more than 30% and a degree of ricinoleic acid-condensation of not less than 5 and not more than 8 and that it has a viscosity of not less than 1,000 mPa·s and not more than 300,000 mPa·s.

(2) The W1/O/W2 type composite emulsified dressing as set forth in the foregoing item 1, wherein the dressing further comprises a polysaccharide for thickening the dressing.

(3) The W1/O/W2 type composite emulsified dressing as set forth in the foregoing item 2, wherein the polysaccharide for thickening the dressing is a highly methoxylated pectin.

(4) The W1/O/W2 type composite emulsified dressing as set forth in the foregoing item 2, wherein the polysaccharide for thickening the dressing is a highly methoxylated pectin whose degree of esterification is not less than 65% and not more than 80%.

(5) W1/O/W2 Type composite emulsified dressing characterized in that the dressing comprises a polyglycerol polyricinoleate and a highly methoxylated pectin.

(6) W1/O/W2 Type composite emulsified dressing characterized in that the dressing comprises a polyglycerol polyricinoleate and a highly methoxylated pectin whose degree of esterification is not less than 65% and not more than 80%.

(7) The W1/O/W2 type composite emulsified dressing as set forth in any one of the foregoing items 1 to 6, wherein the content of the polyglycerol polyricinoleate ranges from 0.01 to 5% by mass.

(8) The W1/O/W2 type composite emulsified dressing as set forth in any one of the foregoing items 3 to 6, wherein the content of the highly methoxylated pectin ranges from 0.1 to 3.0% by mass.

(9) A method for the preparation of a W1/O/W2 type composite emulsified dressing which comprises the steps of 90 to 10 parts by mass of an aqueous phase (W1) is mixed with 10 to 90 parts by mass of an oily phase (O) to thus form a W1/O type emulsion and then 100 parts by mass of the resulting W1/O type emulsion is admixed with 25 to 150 parts by mass of an aqueous phase (W2) to thus give a W1/O/W2 type composite emulsified dressing, wherein the dressing comprises a polyglycerol polyricinoleate having a degree of esterification of not less than 10% and not more than 30% and a degree of ricinoleic acid-condensation of not less than 5 and not more than 8, in an amount ranging from 0.01 to 5% by mass on the basis of the total mass of the W1/O/W2 type composite emulsified dressing.

BEST MODES FOR CARRYING OUT THE INVENTION

The following are the description of the best modes for carrying out the present invention.

To prepare an intended W1/O/W2 type composite emulsified dressing according to the present invention, which is excellent in storage stability, it is important to use a specific polyglycerol polyricinoleate.

Hereunder, the polyglycerol polyricinoleate herein used will also be referred to as "PGPR".

The degree of glycerin-polymerization of the PGPR used in the invention preferably ranges from 4 to 10 and more preferably 6 to 10.

The lower limit of the degree of esterification of the PGPR is not less than 10% and preferably not less than 15%, while the upper limit thereof is not more than 30% and preferably not more than 25%. This is because if the degree of esterification is less than 10% and higher than 30%, the resulting emulsified dressing has such a tendency that it is insufficient in its storage stability and that it undergoes flocculation to thus form cracks and to cause, for instance, creaming phenomenon.

The lower limit of the degree of ricinoleic acid-condensation of the PGPR used in the invention is not less than 5 and preferably not less than 5.5, while the upper limit thereof is not more than 8, preferably not more than 7 and more preferably not more than 6.5. This is because if the degree of ricinoleic acid-condensation is less than 5, the resulting emulsified dressing has such a tendency that it is insufficient in its storage stability and that it undergoes flocculation to thus form cracks and to cause, for instance, creaming phenomenon, while any PGPR product, whose degree of ricinoleic acid-condensation exceeds 8, has not in general been prepared.

The term "degree of esterification of the PGPR" used herein means the rate of condensed ricinoleic acid moieties linked to the polyglycerin moiety. The polyglycerin includes, in the molecule, (n+2) hydroxyl groups on the average, while the average degree of polymerization of the polyglycerin is assumed to be n and therefore, one to (n+2) molecules of condensed ricinoleic acid can be linked to one polyglycerin molecule through the esterification thereof. Thus, when any condensed ricinoleic acid is not linked to the polyglycerin molecule through the esterification thereof, the degree of esterification is herein defined to be 0, while when all of the hydroxyl groups in the polyglycerin take part in the formation of such ester bonds, the degree of esterification is defined to be 100%. For this reason, PGPR is in general a mixture of polyglycerol polyricinoleate having various degrees of esterification and accordingly, the degrees of esterification of PGPR as a mixture is herein defined to be the average degree of esterification of these various kinds of polyglycerol polyricinoleate.

The term "degree of ricinoleic acid-condensation" herein used means the rate of dehydration-condensed ricinoleic acid. The carboxyl group of a ricinoleic acid molecule undergoes esterification with the hydroxyl group of another ricinoleic acid molecule and therefore, the degree of condensation of 2 can be so defined that two ricinoleic acid molecules are condensed, the degree of condensation of 6 can be so defined that six ricinoleic acid molecules are condensed through the foregoing dehydration-condensation. PGPR in general contains ricinoleic acid molecules having various degrees of condensation and accordingly, the degree of ricinoleic acid-condensation of PGPR is herein defined to be the average degree of ricinoleic acid-condensation of these condensed ricinoleic acid molecules.

The term "degree of glycerin-polymerization of PGPR" used herein means the rate of glycerin molecules linked in a polyglycerin molecule, and accordingly, the degree of polymerization (n) can be determined according to the terminal group-analysis technique using the following calculation equation: [(hydroxyl group number)=56110(n+2)/(74n+18)]. The term "hydroxyl group number" herein used means "the amount, as expressed in terms of mg, of potassium hydroxide required for the neutralization of the amount of acetic acid likewise required for the completely acetylation of 1 g of a sample".

The viscosity of the W1/O/W2 type composite emulsified dressing of the present invention ranges from 1,000 to 300,000 mPa·s, preferably 10,000 to 200,000 mPa·s and more preferably 30,000 to 150,000 mPa·s, and it preferably ranges from 1,000 to 200,000 mPa·s while taking into consideration handling properties of the resulting dressing.

The term "dressing" herein used means food products such as dressing, mayonnaise, and semi-solid dressing.

The internal aqueous phase (W1) may simply comprise water, but it is preferred to incorporate, into the aqueous phase, additives such as common salt, vinegar, seasonings (such as sodium glutamate) and sucrose. The amount of common salt to be incorporated into the aqueous phase preferably ranges from about 1 to 15% by mass and that of vinegar to be added thereto in general ranges from about 1 to 10% by mass, on the basis of the total mass of the aqueous phase (W1).

In respect of the outer aqueous phase (W2), it is preferred to incorporate, into the aqueous phase (W2), additives such as common salt, vinegar, seasonings (such as sodium glutamate) and sucrose. The amount of common salt to be incorporated into the aqueous phase preferably ranges from about 1 to 15% by mass and that of vinegar to be added thereto in general ranges from about 1 to 10% by mass, on the basis of the total mass of the aqueous phase (W2).

Moreover, the aqueous phase (W2) may likewise comprise egg yolk in an amount ranging from 5 to 50% by mass on the basis of the total mass of the aqueous phase (W2).

The W1/O/W2 type composite emulsified dressing of the present invention can easily be prepared by emulsifying, in a commonly used emulsifying machine such as a homomixer, 90 to 10 parts by mass, preferably 70 to 30 parts by mass of an aqueous phase (W1), and 10 to 90 parts by mass, preferably 30 to 70 parts by mass of an oily phase (O) to thus form a W1/O type emulsion; preliminarily blending 100 parts by mass of the resulting W1/O type emulsion with 25 to 150 parts by mass, preferably 35 to 100 parts by mass of an aqueous phase (W2); and then emulsifying the blended mixture in an emulsifying machine such as a colloid mill till the resulting emulsion has intended or desired physical characteristic properties. In the foregoing step for preparing the W1/O type emulsion, it is also possible to additionally emulsify the W1/O type emulsion under the influence of a high shearing action using an emulsifying machine such as a colloid mill after the completion of the emulsification in the homomixer for the preparation of a more preferred W1/O type emulsion. The particle size of the W1/O type emulsion is, on the average, not more than 2.5 µm, preferably not more than 2.0 µm and more preferably not more than 1.8 µm. The particle size of the W1/O/W2 type composite emulsion is, on the average, not more than 25 µm, preferably not more than 20 µm and more preferably not more than 18 µm.

The W1/O/W2 type composite emulsified dressing of the present invention is characterized in that it comprises a polyglycerol polyricinoleate (PGPR) having a degree of esterification of not less than 10% and not more than 30% and a degree of ricinoleic acid-condensation of not less than 5 and not more than 8 in an amount ranging from 0.01 to 5% by mass and preferably 0.3 to 4% by mass on the basis of the total mass of the W1/O/W2 type emulsion. The time at which the PGPR is added is not particularly restricted, but PGPR is preferably added to the oily phase (O) since the ester or PGPR is oil-soluble by nature.

The oily phase usable herein may be any edible oils and fats, but specific examples thereof include rapeseed oil, soybean oil, safflower oil, sunflower oil, corn oil, palm oil, rice oil, and olive oil, and they may be used alone or in any combination of at least two of them. The mixing ratio of such a combination may likewise be appropriately determined while taking into consideration currently used blend oils.

In the present invention, it is preferred to use a polysaccharide serving as a thickener (thickening polysaccharide) along with the polyglycerol polyricinoleate, in order to improve the stability of the resulting emulsified product. Examples of such thickening polysaccharides include pectin, xanthan gum, tamarind seed gum, locust bean gum, guar gum, gellan gum, curdlan, pullulan, sodium alginate, and carrageenan. Among them, pectin is preferably used herein because of its high storage stability, highly methoxylated pectin is more preferably used and particularly preferably used herein is a highly methoxylated pectin having a degree of esterification of not less than 65% and not more than 80%.

The degree of esterification of the highly methoxylated pectin means the rate of galacturonic acid moieties constituting the main chain of the pectin, which are converted into their methyl esters and each molecule in which the content of methyl-esterified galacturonic acid moieties is not less than 50% on the basis of the total galacturonic acid moieties constituting the main chain is herein referred to as the foregoing highly methoxylated pectin.

The amount of the thickening polysaccharide to be used preferably ranges from 0.1 to 3% by mass on the basis of the total mass of the resulting blend.

In the present invention, the thickening polysaccharide may be incorporated into any one of the aqueous phase (W1), the oily phase (O) and the aqueous phase (W2), but it is preferred to add the same to the aqueous phase (W2).

EXAMPLES

W1/O/W2 Type composite emulsified dressing having the formulation specified in the following Table 1 were prepared.

There were preliminarily emulsified an aqueous phase (W1) and an oily phase (O) containing a predetermined amount of a polyglycerol polyricinoleate using T. K. Homomixer MARK2 (available from Tokushu Kika-Kogyo K. K. presently called Primix corporation) and then the resulting emulsion was further treated in a colloid mill to thus give a W1/O type emulsion. Moreover, the resulting W1/O type emulsion was blended with a predetermined quantity of an aqueous phase (W2), they were preliminarily emulsified using a stirring machine (three-one motor type one, available from Kabushiki Kaisha IUCHISEIEIDO (presently called ASONE)), and then they were further emulsified in a colloid mill to thus give Sample No. 1 to 8.

Determination of Viscosity:

Viscosity of each sample was determined by storing the same in a thermostatic chamber maintained at 24° C. for 24 hours and then the viscosity thereof was determined using a Brookfield viscometer.

Method for the Evaluation of Storage Stability:

Storage stability of each sample was evaluated by the examination of any change of appearance and viscosity (determined using a Brookfield viscometer) thereof as determined after storage of the sample in a thermostatic chamber maintained at 24° C. over a predetermined period of time. Possible appearance changes include, for instance, generation of cracks at portions at which the sample comes in close contact with the wall of the container thereof and occurrence of syneresis at the top and/or bottom of the container. Regarding the viscosity change, the structure of each sample is in an unstable state when the viscosity undergoes an abrupt change during the storage thereof.

Evaluation:

TABLE 1

|  | Sample No. | | | | | | | |
|---|---|---|---|---|---|---|---|---|
|  | 1 | 2 | 3 | 4 | 5 | 6 | 7 | 8 |
| Note | Comp. | Inv. | Inv. | Comp. | Inv. | Inv. | Inv. | Comp. |
| W1/O Type Emulsion | 75.0 | 75.0 | 75.0 | 75.0 | 65.0 | 65.0 | 65.0 | 40.0 |
| Aqueous Phase (W1) | | | | | | | | |
| Seasonings | 6.5 | 6.5 | 6.5 | 6.5 | 4.5 | 4.5 | 4.5 | 2.0 |
| Fermented vinegar | 6.8 | 6.8 | 6.8 | 6.8 | 7.1 | 7.1 | 7.1 | 6.0 |
| Water | 30.8 | 30.8 | 30.8 | 30.8 | 19.7 | 19.7 | 19.7 | 7.4 |
| Oily Phase (O) | | | | | | | | |
| Vegetable oil | 30.0 | 30.0 | 30.0 | 30.0 | 33.0 | 33.0 | 33.0 | 24.0 |
| PGPR A |  |  | 0.9 |  | 0.7 | 0.7 | 0.7 |  |
| PGPR B |  | 0.9 |  |  |  |  |  |  |
| PGPR C | 0.9 |  |  |  |  |  |  | 1.2 |
| PGPR D |  |  |  | 0.9 |  |  |  |  |
| Aqueous Phase (W2) | 25.0 | 25.0 | 25.0 | 25.0 | 35.0 | 35.0 | 35.0 | 60.0 |
| HM Pectin a |  |  |  |  | 0.6 |  |  |  |
| HM Pectin b |  |  |  |  |  | 0.6 |  |  |
| HM Pectin c |  |  |  |  |  |  | 0.6 | 1.2 |
| Xanthan gum |  |  |  |  | 0.02 | 0.02 | 0.02 |  |
| Seasonings | 2.6 | 2.6 | 2.6 | 2.6 | 3.8 | 3.8 | 3.8 | 7.0 |
| Egg Yolk | 6.0 | 6.0 | 6.0 | 6.0 | 8.0 | 8.0 | 8.0 | 4.0 |
| Fermented vinegar | 7.0 | 7.0 | 7.0 | 7.0 | 7.2 | 7.2 | 7.2 | 7.0 |
| Water | 9.40 | 9.40 | 9.40 | 9.40 | 15.38 | 15.38 | 15.38 | 40.80 |
| Viscosity (Pa·s) | 90 | 70 | 80 | 70 | 60 | 50 | 50 | 30 |
| Storage Stability | × | ○ | ○ | × | ◎ | ◎ | ○ | × |

◎: The Sample examined was considerably stable;
○: The sample examined was stable;
×: The sample examined was unstable.
Fermented vinegar: This had an acid value of 5%.
Seasonings: This contained common salt, sucrose, and sodium glutamate. The seasonings used in the aqueous phase W1 were fundamentally identical to those used in the aqueous phase W2.

The PGPR used in these Examples had the degree of esterification, the degree of ricinoleic acid-condensation, and the degree of glycerin-polymerization as specified in the following Table and the highly methoxylated pectin (HM Pectin) had the degree of esterification likewise detailed in the following Table 2.

TABLE 2

|  | Degree of Esterification | Degree of ricinoleic acid-condensation | Degree of glycerin-polymerization |
|---|---|---|---|
| PGPR A | 20 | 6 | 6 |
| PGPR B | 25 | 5 | 10 |
| PGPR C | 40 | 5.5 | 10 |
| PGPR D | 28 | 3.5 | 6 |

|  | Degree of Esterification |
|---|---|
| HM Pectin a | 72 |
| HM Pectin b | 68 |
| HM Pectin c | 55 |

The experimental data listed in the foregoing Tables clearly indicate that the samples 2, 3, 5, 6, and 7 according to the present invention, which made use of PGPR A and B of the present invention (having degrees of esterification of 20% and 25% and degrees of ricinoleic acid-condensation of 6 and 5, respectively) showed storage stability definitely superior to that observed for the comparative samples 1 and 8 in which the PGPR having a degree of esterification of 40% was used and that observed for the comparative sample 4 which made use of PGPR D having a degree of ricinoleic acid-condensation of 3.5.

In addition, the samples 5 and 6 which made use of a specific highly methoxylated pectin a (degree of esterification: 72%) and a specific highly methoxylated pectin b (degree of esterification: 68%) according to the present invention showed storage stability considerably superior to those observed for other samples examined.

INDUSTRIAL APPLICABILITY

The W1/O/W2 type composite emulsified dressing of the present invention comprise polyglycerol polyricinoleate each having a specific degree of esterification and a specific degree of ricinoleic acid-condensation and accordingly, they have considerably excellent storage stability.

In addition, the dressing of the present invention are prepared in the form of W1/O/W2 type composite emulsions. For this reason, the resulting emulsions have an apparently high content of oily components although the real content thereof is rather low and the dressing have thus improved oily feeling, fatty feeling and good body, which have hardly been achieved by conventional O/W type emulsion having a low content of oily components.

Furthermore, the W1/O/W2 type composite emulsified dressing of the present invention are significantly excellent in storage stability and therefore, it is possible to impart, to these dressing, such characteristic properties that, when a specific seasoning is incorporated into the aqueous phase W1, the user would recognize the taste thereof after the elapse of a certain period of time or a milder taste can be imparted to the resulting dressing, as compared with the dressing in which the seasoning is incorporated into the aqueous phase W2.

In addition, raw materials which may undergo immediate deterioration of taste and palatability/functions can be incorporated into the aqueous phase W1 to thus prevent any premature deterioration thereof and further when adding, to the aqueous phase W1, for instance, nutrient components which have a bitter taste and/or an astringent taste and which cannot easily be taken according to usual manner, the bitter and/or astringent taste thereof can be concealed and therefore, the user can take such components with great ease.

What is claimed is:

1. A W1/O/W2 type composite emulsified dressing comprising
   (1) a polyglycerol polyricinoleate having:
      a degree of esterification of not less than 10% and not more than 30%;
      a degree of ricinoleic acid-condensation of not less than 5 and not more than 8;
      a degree of glycerin-polymerization of 4 to 10; and
   (2) highly methoxylated pectin in an amount ranging from 0.1 to 3% by mass on the basis of the total mass of the W1/O/W2 type emulsified dressing, wherein
      said emulsified dressing has a viscosity of not less than 1,000 mPa·s and not more than 300,000 mPa·s,
      the amount of the polyglycerol polyricinoleate is 0.01 to 5% by mass on the basis of the total mass of the W1/O/W2 type emulsified dressing,
      the amount of an aqueous phase (W1) is 90 to 10 parts by mass,
      the amount of an oily phase (O) is 10 to 90 parts by mass, and
      the amount of an aqueous phase (W2) is 25 to 150 parts by mass.

2. The W1/O/W2 type composite emulsified dressing as set forth in claim 1, wherein the degree of esterification of said highly methoxylated pectin is not less than 65% and not more than 80%.

3. A method for the preparation of a W1/O/W2 type composite emulsified dressing which comprises
   mixing 90 to 10 parts by mass of an aqueous phase (W1) with 10 to 90 parts by mass of an oily phase (O) to thus form a W1/O type emulsion, and
   then blending 100 parts by mass of the resulting W1/O type emulsion with 25 to 150 parts by mass of an aqueous phase (W2) to thus give a W1/O/W2 type composite emulsified dressing, wherein
   the dressing comprises
   (1) a polyglycerol polyricinoleate having: a degree of esterification of not less than 10% and not more than 30%; a degree of ricinoleic acid-condensation of not less than 5 and not more than 8; and a degree of glycerin-polymerization of 4 to 10, in an amount ranging from 0.01 to 5% by mass on the basis of the total mass of the W1/O/W2 type composite emulsified dressing; and
   (2) highly methoxylated pectin in an amount ranging from 0.1 to 3% by mass on the basis of the total mass of the W1/O/W2 type emulsified dressing.

4. The W1/O/W2 type composite emulsified dressing as set forth in claim 1, wherein the amount of the polyglycerol polyricinoleate ranges from 0.3 to 4% by mass on the basis of the total mass of the W1/O/W2 type emulsified dressing.

5. The method of claim 3, wherein the degree of esterification of said highly methoxylated pectin is not less than 65% and not more than 80%.

6. The method of claim 3, wherein the amount of the polyglycerol polyricinoleate ranges from 0.3 to 4% by mass on the basis of the total mass of the W1/O/W2 type emulsified dressing.

* * * * *